Jan. 9, 1951 R. L. STEVENSON 2,537,799
COVER LATCH FOR AUTOMOBILE BAGGAGE COMPARTMENTS
Filed Nov. 28, 1949 2 Sheets-Sheet 1

INVENTOR,
Robert Louis Stevenson
BY
Roy E. Hamilton,
Attorney.

Patented Jan. 9, 1951

2,537,799

UNITED STATES PATENT OFFICE 2,537,799

COVER LATCH FOR AUTOMOBILE BAGGAGE COMPARTMENTS

Robert Louis Stevenson, Overland Park, Kans.

Application November 28, 1949, Serial No. 129,740

9 Claims. (Cl. 217—60)

This invention relates to new and useful improvements in the cover latches for automobile baggage compartments, and is an improvement over the device shown in my Patent No. 2,497,102, issued February 14, 1950.

The principal object of the present invention is the provision, in a cover latch for automobile baggage compartments including an arm pivoted to an automobile body in spaced relation to the hinge of said cover and carrying a latch bar adapted to engage a notch in a latch member secured to said cover when said cover is opened, of novel means for attaching said arm to said cover so that it will at all times move in a prescribed relation thereto, and for urging said arm firmly in non-rattling relation against said cover when said cover is closed.

Another object is the provision, in a cover latch of the class described, of novel means for releasing said cover latch simply by a slight upward movement of the cover.

A further object is the provision, in a cover latch of the class described, of means for preventing lateral flexing of the arm when the cover is in the open position.

Other objects are simplicity and economy of construction, efficiency and convenience of operation, conservation of space within the baggage compartment, and adaptability for use with many types and styles of automobiles.

With these objects in view, as well as other objects which will appear in the course of the specification, reference will be had to the drawing, wherein.

Figure 1:
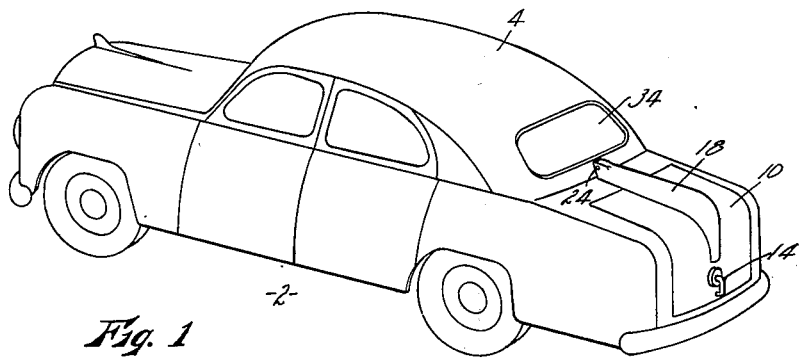
Figure 1 is a perspective veiw of an automobile, with a baggage compartment cover latch embodying the present invention attached thereto.

Like reference numerals apply to similar parts throughout the several views, and the numeral 2 applies to an automobile having a body 4 enclosing within its rearward portion the usual baggage compartment or trunk 6. Said baggage compartment is accessible through an opening 8 formed in the body, and said opening is provided with a cover or lid 10 connected at its forward end with body 4 by means of a single hinge 12 disposed in the longitudinal centerline of the automobile. The axis of said hinge extends transversely to the automobile. At its rearward edge, which is usually curved downwardly, cover 10 is provided with a lock mechanism 14 adapted to engage a keeper 16 carried by car body 4 at the rearward edge of opening 8, thereby securing said cover in its closed position. Said lock mechanism may be of any suitable type, and is not shown in detail.

Figure 5:
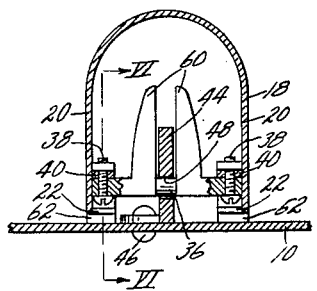
Fig. 5 is an enlarged fragmentary section taken on line V—V of Fig. 2, with the cover closed.
Figure 2:
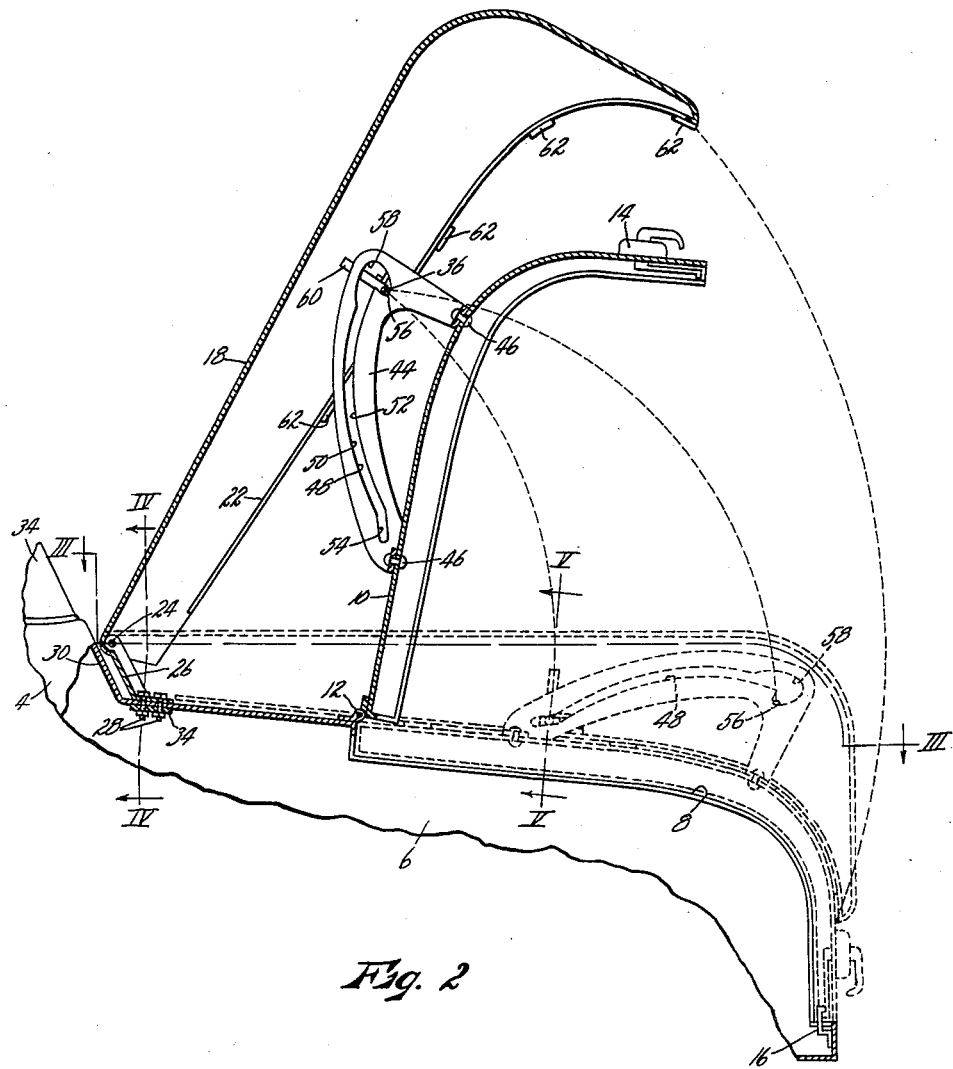
Fig. 2 is an enlarged fragmentary vertical longitudinal section of the rearward portion of the automobile, showing the baggage compartment cover, latch, and associated parts, with parts left in elevation. The cover is shown open in solid lines and closed in dotted lines.

The latch for securing cover 10 in the open position includes an arm 18 formed preferably of sheet metal and having in cross-section a substantially inverted U-form, as best shown in Fig. 5, thus presenting side walls 20. Forming the arm in this manner provides good strength and rigidity with a minimum of weight, and provides a hollow interior within which the latch parts are normally concealed. Said arm is disposed longitudinally of the automobile, and is adapted to overlie the outer surface of cover 10 and the surface of car body 10 immediately forward of said cover, as shown in Fig. 1 and Fig. 2. The lower edges of side walls 20 are shaped to conform to the contour of the cover and adjacent portion of the car body and are provided with inwardly turned flanges 22 extending substantially the full length thereof. The contour of the outer edge of the arm is entirely a question of choice, so long as there is sufficient space therein to accommodate the latch parts hereinafter described.

At its forward end arm 18 is pivotally connected by a pin 24 to a bracket 26 for movement in a vertical plane, the pivotal axis thereof being parallel to the pivotal axis of cover 10. Said bracket is fixed by means of bolts 28 to car body 4 in forwardly spaced relation from the axis of hinge 12 and adjacent the inclined portion 30 of car body 4 which carries the usual rear window 32. A reinforcing plate 34 may be placed against the inner surface of car body 4 to receive bolts 28.

Figure 6:
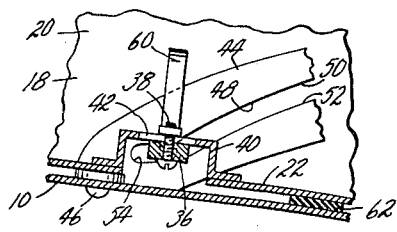
Fig. 6 is a fragmentary section taken on line VI—VI of Fig. 5.

A latch bar 36 extends between side walls 20 of arm 18 intermediate the ends thereof, being parallel to the pivotal axis of said arm. Each end portion of said latch bar is flattened and is secured by means of a bolt 38 to an inverted U-shaped bracket 40 welded or otherwise rigidly secured to the upper surface of the adjacent arm flange 22, as best shown in Figs. 5 and 6. Said bolts extend through elongated slots 42 formed in said brackets, said slots extending longitudinally of arm 18. Thus by loosening bolts 38, latch bar 36 may be moved forwardly or rearwardly, for a purpose hereinafter appearing. Flanges 22 are cut out between the legs of brackets 40, as best shown in Fig. 6, in order to provide access to bolts 38 when arm 18 is raised.

Figure 3:
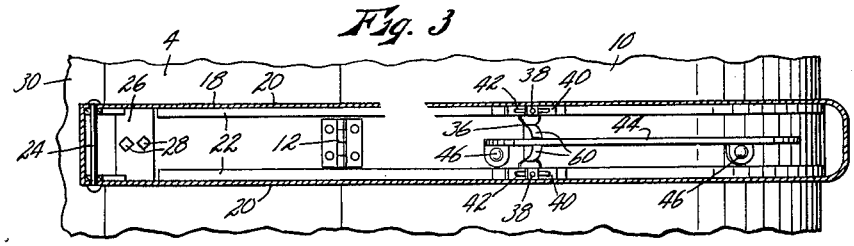
Fig. 3 is a fragmentary section taken on line III—III of Fig. 2, with the cover closed.
Figure 4:
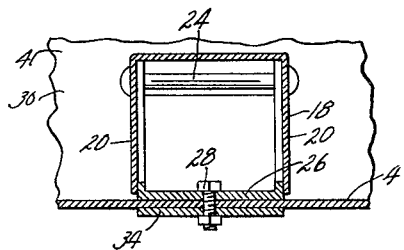
Fig. 4 is an enlarged fragmentary section taken on line IV—IV of Fig. 2, with the cover closed.

Latch bar 36 is contacted and moved by a latch plate 44 carried by cover 10. As best shown in Figs. 2 and 3, said latch plate is fixed to the outer surface of cover 10 by any suitable means such as rivets 46, and is disposed in a vertical plane at the longitudinal centerline of the automobile, extending upwardly into arm 18. Said plate is provided with an elongated slot 48 through which latch bar 36 extends, said slot having an upper wall 50 and a lower wall 52. The forward end portion 54 of said slot is adjacent cover 10, being straight and inclined upwardly and rearwardly. Latch bar 36 is carried in this portion of the slot when the cover is closed. The slot then inclines upwardly at a sharper angle, and curves rearwardly, as best shown in Fig. 2. Adjacent its rearward end, lower wall 52 of the slot is offset downwardly to form a notch 56 which is adapted to engage the latch bar when the cover is open. Notch 56 is connected with upper wall 50 of the slot by a smoothly curved wall 58 which curves upwardly and rearwardly from notch 56, then forwardly and downwardly to connect with wall 50. It will be noted that wall 58 extends forwardly from notch 56. Latch bar 36 is provided with a pair of spaced apart integral guide members 60 which extend upwardly therefrom at opposite sides of latch plate 44. Said guide members prevent transverse flexing of arm 18 when said arm is in its raised position. A plurality of resilient pads 62 made of rubber or other suitable material are cemented to the lower surfaces of flanges 22 at spaced intervals along the portions thereof overlying cover 10. Said pads protect the finish of the automobile body and prevent rattling of the latch as hereinafter described.

The operation of the latch is substantially as follows: When cover 10 is unlocked and raised in the usual manner, the lower wall 52 of slot 48 contacts and raises latch bar 36, which in turn raises arm 18. Since said arm is pivoted at a point spaced forwardly from the cover hinge, raising the cover causes latch bar 36 to be forced rearwardly relative to the cover, and said latch bar moves slidably in slot 48. The inclination of said slot away from cover 10 causes a quick separation of arm 18 from said cover, and permits said arm and cover to pivot freely without interferences. As shown in Fig. 2, latch bar 36 and notch 56 of slot 48 move in converging arcs as the cover is raised. When the cover has been raised sufficiently to bring latch bar 36 opposite notch 56, said latch bar will fall into said notch by gravity. The cover is then securely latched in the open position as shown in solid lines in Fig. 2, since the latch bar will prevent any downward pivotal movement of the cover. The forward face of notch 56 is undercut to prevent accidental dislodgment of the latch bar therefrom.

When it is desired to close the cover, the cover is first pushed slightly upwardly and then allowed quickly to pivot downwardly toward its closed position. The upward movement of the cover causes the latch bar to move along wall 58 of the slot, and as the cover pivots downwardly said latch bar will be retained against wall 58 by inertia, thereby passing over the entry to notch 56. As the cover is lowered, latch bar 36 rides along lower wall 52 of slot 48 until pads 62 contact the outer surface of cover 10. At that time the downward movement of arm 18 is momentarily arrested until the upper wall 50 of the slot strikes latch bar 36. During the final closing movement of the cover, the latch bar is forced downwardly toward the cover by latch plate 44, thereby forcing the arm firmly against the cover and resiliently compressing pads 62. The resilience of said pads holds the parts firmly against rattling or relative movement. The latch bar may be moved adjustably forwardly or rearwardly as previously described, in order that pads 62 will be properly compressed when the cover is fully closed.

This adjustment provides a compensation for variations of manufacture in the automobile body and inaccuracies of mounting the latch parts thereon, and also provides means for taking up wear of the rubber pads. Forming the forward end portion 54 of slot 48 at a smaller angle of inclination to cover 10 than the adjacent portion of said slot provides that the adjustment of latch bar 36 will be less critical, and that a larger component of the downward force of the cover will be utilized for holding the arm against the cover.

Thus it is apparent that a cover latch having several advantages has been produced. The enclosure of the latch parts in proper relation at all times, and prevents separation of the arm and cover. The latch engages automatically when the cover is opened and may be disengaged by a simple movement of the cover. The latch bar serves the triple function of securing the cover in the open position, guiding the arm in proper relation to the cover, and pressing the arm against the cover when said cover is closed. The latch is adjustable to compensate for wear and for inaccuracies of manufacture. The latch is disposed entirely outside of the luggage compartment. The working parts of the latch are normally completely concealed within an arm member, the shape of which may be varied widely to blend with and contribute to the artistic appearance of the automobile. The cover hinge may be concealed within the arm as shown. By varying the size and configuration of the latch plate, the latch may be adapted for use on automobiles permitting greater or smaller distances between the arm and cover hinges, or different body contours. The latch is extremely simple, durable, rattle-proof, and not likely to get out of order.

While I have disclosed a specific embodiment of my invention, it is apparent that many minor changes of construction and operation could be made without departing from the spirit of the invention.

What I claim is:

1. The combination, with an automobile having a luggage compartment and a generally upwardly opening cover for said luggage compartment hingeably secured to the body of said automobile, of a latch for securing said cover in the open position comprising a latch plate fixed to the outer surface of said cover in a plane at right angles to the pivotal axis thereof and in spaced relation to said axis, said latch plate having a slot formed therein with a downwardly offset notch adjacent the end thereof nearest the free edge of said cover, an arm pivoted to said automobile body about an axis disposed in spaced-apart relation from said cover axis and parallel thereto, said arm overlying said cover, and a latch bar carried by said arm parallel to the axis thereof and extending through the slot of said latch plate, whereby as said cover is opened said latch bar and said notch will move in converging arcs, said latch bar moving slidably in said slot until it falls into said notch.

2. The combination, with an automobile having a luggage compartment and a generally upwardly opening cover for said luggage compartment hingeably secured along one edge to the body of said automobile of a latch for securing said cover in the open position comprising a latch plate fixed to the outer surface of said cover in a plane at right angles to the pivotal axis thereof and in spaced relation to said axis, said latch plate having a slot formed therein, said slot being inclined outwardly from the surface of said cover in the direction of the free edge of said cover and having a downwardly offset notch formed adjacent the outer end thereof, an arm pivoted to said automobile body about an axis disposed in spaced relation from said cover axis and parallel thereto, said arm overlying said cover, and a latch bar fixed to said arm parallel to the pivotal axis thereof, said latch bar projecting through said slot adjacent the end thereof nearest the cover axis when said cover is closed, whereby when said cover is opened said latch bar will move through said slot and engage said notch, and whereby when said cover is closed said latch plate will engage said latch bar to force said arm against said cover.

3. The combination, with an automobile having a luggage compartment and a generally upwardly opening cover for said luggage compartment hingeably secured to the body of said automobile, of a latch for securing said cover in the open position comprising a latch plate fixed to the outer surface of said cover in a plane at right angles to the pivotal axis thereof and in spaced relation to said axis, said latch plate having a slot formed therein with a downwardly offset notch adjacent the end thereof nearest the free edge of said cover, an arm pivoted to said automobile body about an axis disposed in spaced-apart relation from said cover axis and parallel thereto, said arm overlying said cover, a latch bar carried by said arm parallel to the axis thereof and extending through the slot of said latch plate, whereby as said cover is opened said latch bar and said notch will move in converging arcs, said latch bar moving slidably in said slot until it falls into said notch, and a pair of guides fixed to said latch bar and extending along opposite sides of said latch plate.

4. The combination, with an automobile having a luggage compartment and a generally upwardly opening cover for said luggage compartment hingeably secured along one edge to the body of said automobile, of a latch for securing said cover in the open position comprising a latch plate fixed to the outer surface of said cover in a plane at right angles to the pivotal axis thereof and in spaced relation to said axis, said latch plate having a slot formed therein, said slot being inclined outwardly from the surface of said cover in the direction of the free edge of said cover and having a downwardly offset notch formed adjacent the outer end thereof, an arm pivoted to said automobile body about an axis disposed in spaced relation from said cover axis and parallel thereto, said arm overlying said cover, a latch bar fixed to said arm parallel to the pivotal axis thereof, said latch bar projecting through said slot adjacent the end thereof nearest the cover axis when said cover is closed, whereby when said cover is opened said latch bar will move through said slot and engage said notch, and whereby when said cover is closed said latch plate will engage said latch bar to force said arm against said cover, and a plurality of resilient pads carried by said arm and adapted to be compressed between said arm and said cover when said cover is closed.

5. The combination, with an automobile having a luggage compartment and a generally upwardly opening cover for said luggage compartment hingeably secured along one edge to the body of said automobile, of a latch for securing said cover in the open position comprising a latch plate fixed to the outer surface of said cover in a plane at right angles to the pivotal aixs thereof and in spaced relation to said axis, said latch plate having a slot formed therein, said slot being inclined outwardly from the surface of said cover in the direction of the free edge of said cover and having a downwardly offset notch formed adjacent the outer end thereof, an arm pivoted to said automobile body about an axis disposed in spaced relation from said cover axis and parallel thereto, said arm overlying said cover, a latch bar fixed to said arm parallel to the pivotal axis thereof, said latch bar projecting through said slot adjacent the end thereof nearest the cover axis when said cover is closed, whereby when said cover is opened said latch bar will move through said slot and engage said notch, and whereby when said cover is closed said latch plate will engage said latch bar to force said arm against said cover, and means for adjusting said latch bar longitudinally of said arm.

6. The combination, with an automobile having a luggage compartment and a generally upwardly opening cover for said luggage compartment hingeably secured along one edge to the body of said automobile, of a latch for securing said cover in the open position comprising a latch plate fixed to the outer surface of said cover in a plane at right angles to the pivotal axis thereof and in spaced relation to said axis, said latch plate having a slot formed therein, said slot being inclined outwardly from the surface of said cover in the direction of the free edge of said cover and having a downwardly offset notch formed adjacent the outer end thereof, an arm pivoted to said automobile body about an axis disposed in spaced relation from said cover axis and parallel thereto, said arm overlying said cover, a latch bar fixed to said arm parallel to the pivotal axis thereof, said latch bar projecting through said slot adjacent the end thereof nearest the cover axis when said cover is closed, whereby when said cover is opened said latch bar will move through said slot and engage said notch, and whereby when said cover is closed said latch plate will engage said latch bar to force said arm against said cover, a plurality of resilient pads carried by said arm and adapted to be compressed between said arm and said cover when said cover is closed, and means for adjustably moving said latch bar longitudinally relative to said arm.

7. The combination, with an automobile having a luggage compartment and a generally upwardly opening cover for said luggage compartment hingeably secured along one edge to the body of said automobile, of a latch for securing said cover in the open position comprising a latch plate fixed to the outer surface of said cover in a plane at right angles to the pivotal axis thereof and in spaced relation to said axis, said latch plate having a slot formed therein, said slot being inclined outwardly from the surface of said cover in the direction of the free edge of said cover and having a downwardly offset notch formed adjacent the outer end thereof, and having its opposite end portion inclined relative to said cover to a smaller degree than the adjacent portion of said slot, an arm pivoted to said automobile body about an axis disposed in spaced relation from said cover axis and parallel thereto, said arm overlying said cover, a latch bar fixed to said arm parallel to the pivotal axis thereof and extending through said slot, said latch bar being positioned in said slot section of smaller inclination when said cover is closed, and means for adjusting said latch bar longitudinally relative to said arm.

8. The combination, with an automobile having a luggage compartment and a generally upwardly opening cover for said luggage compartment hingeably secured along one edge to the body of said automobile, of a latch for securing said cover in the open position comprising a latch plate fixed to the outer surface of said cover in a plane at right angles to the pivotal axis thereof and in spaced relation to said axis, said latch plate having a slot formed therein, said slot being inclined outwardly from the surface of said cover in the direction of the free edge of said cover and having a downwardly offset notch formed adjacent the outer end thereof, the end wall of said slot adjacent said notch being curved smoothly from the bottom of said notch to the top wall of said slot, an arm pivoted to said automobile body about an axis parallel to and spaced apart from said cover axis, and a latch bar extending through said slot at right angles to said latch plate and fixed rigidly to said arm, said latch bar extending through the inner end portion of said slot when said cover is closed.

9. The combination, with an automobile having a luggage compartment and a generally upwardly opening cover for said luggage compartment hingeably secured along one edge to the body of said automobile, of a latch for securing said cover in the open position comprising a latch plate fixed to the outer surface of said cover in a plane at right angles to the pivotal axis thereof and in spaced relation to said axis, said latch plate having a slot formed therein, said slot being inclined outwardly from the surface of said cover in the direction of the free edge of said cover and having a downwardly offset notch formed adjacent the outer end thereof, the upper wall of said slot and the bottom wall of said notch being connected by a smoothly curved wall, said curved wall extending above the extended line of said top slot wall and overlapping the entry to said notch, an arm pivoted to said automobile body about an axis parallel to and spaced apart from said cover axis, and a latch bar extending through said slot at right angles to said latch plate and fixed rigidly to said arm, said arm extending through the inner end portion of said slot when said cover is closed.

ROBERT LOUIS STEVENSON.

No references cited.